United States Patent

Bourgault et al.

[11] Patent Number: 4,993,499
[45] Date of Patent: Feb. 19, 1991

[54] WING PACKER

[75] Inventors: Gerard F. Bourgault; Richard P. Coquet, both of St. Brieux, Canada

[73] Assignee: F. P. Bourgault Industries Air Seeder Division Ltd., St. Brieux, Canada

[21] Appl. No.: 413,102

[22] Filed: Sep. 26, 1989

[30] Foreign Application Priority Data

Sep. 1, 1989 [CA] Canada ................................. 610168

[51] Int. Cl.⁵ .......................... A01B 35/16; A01B 73/04
[52] U.S. Cl. .................................... 172/294; 172/311; 172/626
[58] Field of Search ................ 172/170, 310, 311, 456, 172/466, 532, 552, 579, 613, 619, 623, 624, 626, 629, 633, 657, 662

[56] References Cited

U.S. PATENT DOCUMENTS

| 3,592,271 | 7/1971 | Schneider | 172/629 X |
| 4,324,296 | 4/1982 | Schenk et al. | 172/311 |
| 4,418,762 | 12/1983 | Page | 172/311 |
| 4,519,460 | 5/1985 | Gust | 172/657 X |
| 4,700,784 | 10/1987 | Wiebe et al. | 172/311 X |
| 4,821,809 | 4/1989 | Summach et al. | 172/311 X |

FOREIGN PATENT DOCUMENTS

| 260122 | 4/1926 | Canada . |
| 594258 | 3/1960 | Canada . |
| 803220 | 1/1969 | Canada . |
| 894556 | 3/1972 | Canada . |
| 940308 | 1/1974 | Canada . |
| 1031621 | 5/1978 | Canada . |
| 1032812 | 6/1978 | Canada . |
| 1043150 | 11/1978 | Canada . |
| 1081021 | 7/1980 | Canada . |
| 1082029 | 7/1980 | Canada . |
| 1096685 | 3/1981 | Canada . |
| 1160886 | 1/1984 | Canada . |
| 1170894 | 7/1984 | Canada . |
| 1220068 | 4/1987 | Canada . |
| 2057833 | 4/1981 | United Kingdom | 172/311 |

OTHER PUBLICATIONS

Lely (UK) Ltd., Ringmaster Hydraulic Folding Ring Rollers, Mar. 1986, 4 pages, published by Lely (UK) Ltd.

Primary Examiner—Randolph A. Reese
Assistant Examiner—Jeffrey L. Thompson
Attorney, Agent, or Firm—Finnegan, Henderson, Farabow, Garrett & Dunner

[57] ABSTRACT

A wing packer has a middle frame section and two wing frame sections to which rollers are attached. The packer can be converted to a transport position by a hydraulic system which lifts the middle section and pivots the wing sections upward. The rollers are connected to the frame about a two-axis pivot which facilitates their remaining in contact with the ground on uneven terrain.

7 Claims, 3 Drawing Sheets

WING PACKER

BACKGROUND OF THE INVENTION

This invention relates to an agricultural implement of the type commonly known as a packer. In particular, it relates to a wing-type packer in which the wing sections can be pivoted upward out of contact with the ground so the packer can be conveniently transported.

Packers are farm machines that are towed behind tractors or other vehicles. Their purpose is to pack the soil over which they are pulled, typically during seedbed preparation, in order to reduce moisture loss therefrom. They are often used behind a cultivator, disker or air seeder, being hitched behind these implements as they are towed by a tractor in order to pack the soil after it has been disturbed by the action of the ground-engaging implement.

One problem with prior art packers is the difficulty of maintaining all the rollers of the packer in full contact with the ground on uneven terrain. A further problem is that great strain is exerted on the packer frame when a roller goes over a rock or other obstacle.

SUMMARY OF THE INVENTION

The present invention is directed to a packer having a middle section and two wing sections, which extend laterally from either side of the middle section. The sections are supported by ground-engaging wheels which support the packer as it is towed. The wing sections are pivotally attached to the middle section and can be pivoted upwards into a substantially vertical position when the packer is to be transported. Rollers are attached to the middle and wing sections in a manner that permits them to roll along the ground behind the frame member, following the contours of the ground and rising up and over irregularities in the ground, such as large rocks, without putting excessive stress on the frame members. This is accomplished by means of pivotal attachment of the rollers about an axis substantially parallel to the ground and perpendicular to the forward direction of travel of the packer as it is towed. By virtue of this pivotal attachment, each roller can rise over an obstacle independently of the other rollers and without lifting the packer frame as a whole.

At the same time, the rollers are also pivotally attached to the packer frame about a second axis, which is perpendicular to the first axis. This permits the rollers to better remain in contact with the ground over their full width as they are pulled over uneven terrain, by a pivoting motion.

In order to facilitate transport of the packer, means are provided for pivotally lifting the middle frame section upward, relative to the ground-engaging wheels which support it, so that the rollers attached to the middle frame section are lifted out of contact with the ground. Means are also provided for pivotally lifting the wing frame sections upward from the working position to the transport position.

In a preferred embodiment, the packer frame includes forward and rearward laterally extending structural members, rollers being attached to both the forward and to the rearward members. Preferably, the rollers are arranged so that alternating ones are attached to the forward members and to the rearward members.

In another preferred embodiment, the wing sections can pivot upwards or downwards, relative to the middle section, in response to irregularities in the ground.

A hydraulic system is used to lift the middle and wing sections into the transport position. This system can include a pair of hydraulic cylinders to lift the middle frame section and a pair of hydraulic cylinders to lift the wings. Preferably, when converting the packer to the transport position, the middle frame section is lifted before the wing sections, and when converting back to the working position, the wing sections are lowered before the middle section. This is preferably accomplished by sequencing means controlling the hydraulic system, though it is also possible to provide two separate hydraulic systems which are actuated in the proper order by the operator.

BRIEF DESCRIPTION OF THE DRAWINGS

In drawings which illustrate embodiments of the invention.

DETAILED DESCRIPTION OF THE PREFERRED EMBODIMENTS

Figure 4:
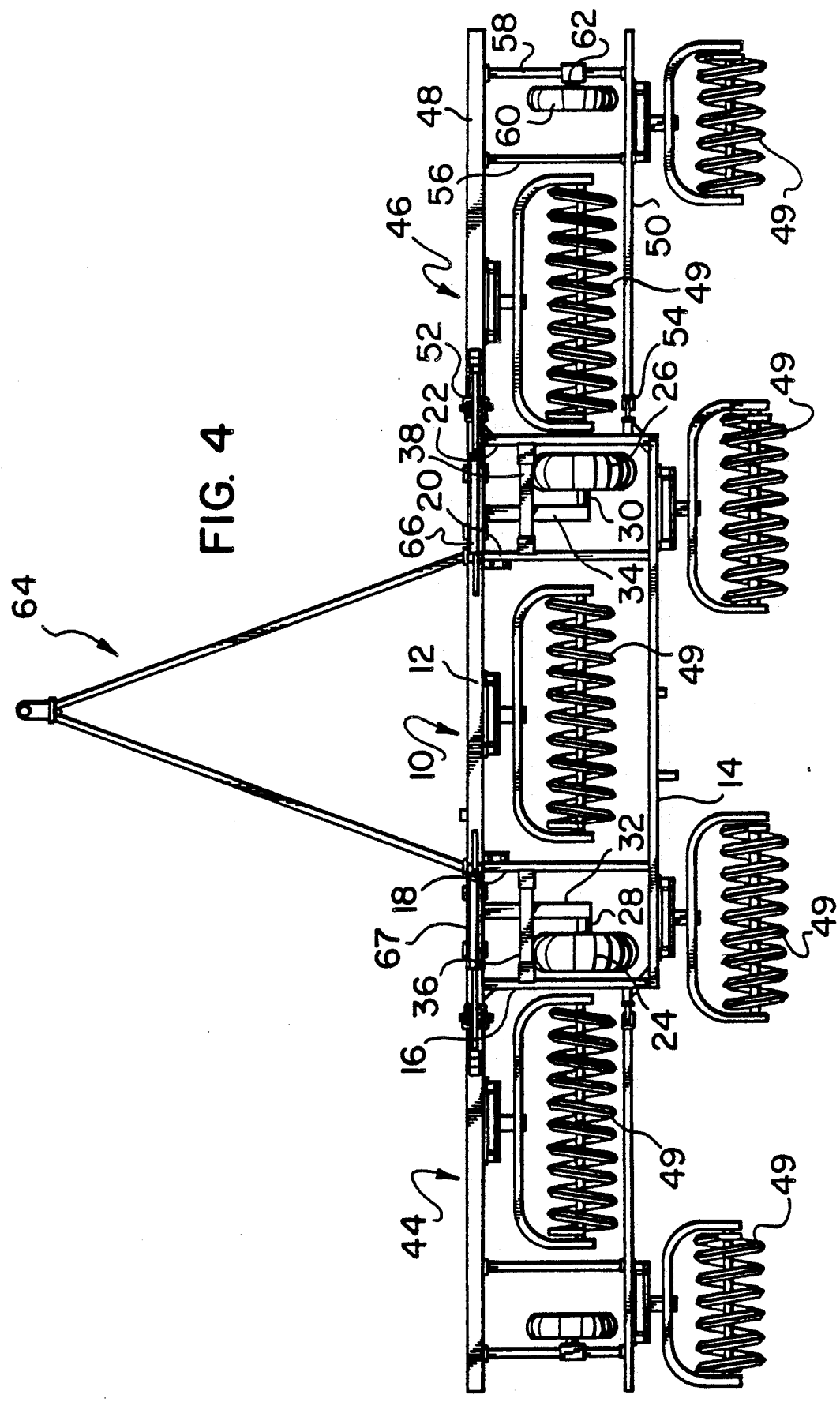
FIG. 4 is a top plan view of the embodiment shown in FIG. 1.

The packer has a middle frame section, shown generally at 10 in FIG. 4, having a forward laterally-extending member 12 and a rearward laterally-extending member 14. The forward and rearward members 12, 14 are rigidly affixed to each other by frame members 16, 18, 20 and 22.

Figure 2:
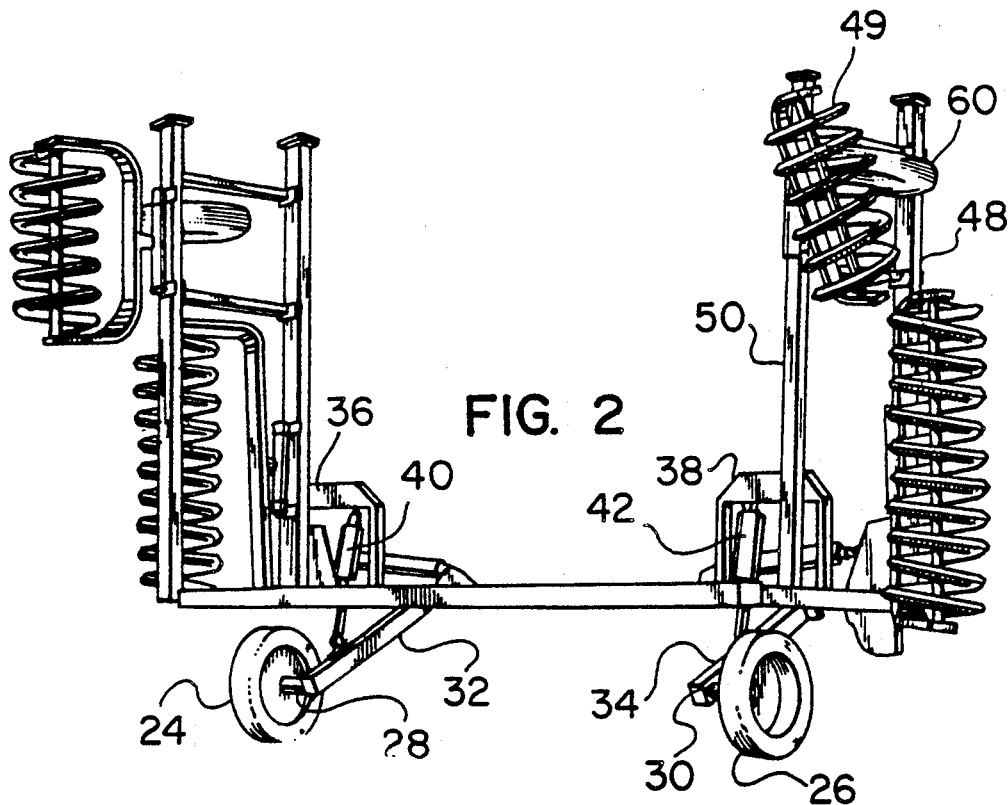
FIG. 2 is a rear perspective view of the packer shown in FIG. 1, in the transport position with the middle frame section rollers removed.

The middle frame section 10 is supported on the ground by two ground-engaging wheels 24, 26, which can rotate on fixed axles 28, 30 respectively, parallel to the ground and perpendicular to the forward direction of travel of the packer. The axles 28, 30 are affixed to the lower end of wheel support members 32, 34 respectively, which are pivotally attached at their upper ends to the forward member 12. Frame members 36, 38 are affixed between frame members 16 and 18, and 20 and 22 respectively. As shown in FIG. 2, hydraulic cylinders 40, 42 are affixed between wheel support members 32 and frame member 36, and between wheel support members 34 and frame member 38 respectively. The attachments at each end of hydraulic cylinders 40, 42 are pivotal. Activation of hydraulic cylinders 40, 42 lifts the middle frame section 10, as described below.

Two wing frame sections 44, 46 extend laterally outward from middle frame section 10, one wing frame at either end. For convenience the structure of only one wing frame section and its accompanying wheel, rollers and hydraulic system will be described, it being understood that the other wing frame section is the mirror image thereof.

Wing frame section 46 has a laterally-extending forward member 48 and a laterally-extending rearward member 50. Forward member 48 is rigidly affixed to rearward member 50 by frame members 56 and 58. Forward member 48 is pivotally connected to forward member 12 of the middle frame section 10 by hinge 52. The axis of hinge 52 is parallel to the ground and perpendicular to forward member 48. Similarly, rearward member 50 is pivotally connected to frame member 22 by hinge 54, whose axis is parallel to the ground and perpendicular to rearward member 50. A hydraulic cylinder 66 is affixed between forward member 12 of the middle frame section 10 and forward member 48 of wing frame section 46. The attachments at either end of cylinder 66 are pivotal. Hydraulic cylinder 66 and hinges 52, 54 permit the pivoting of wing frame section 50 relative to middle frame section 10 as described below.

Wing frame section 46 is supported at its outer end by ground-engaging wheel 60, which can turn about fixed axle 62. Axle 62 is affixed to frame member 58. Wheel 62 is parallel to wheels 24, 26.

A hitch 64 is affixed to forward member 12 of the middle frame section 10 for attachment to a tractor or other farm implement.

Figure 1:
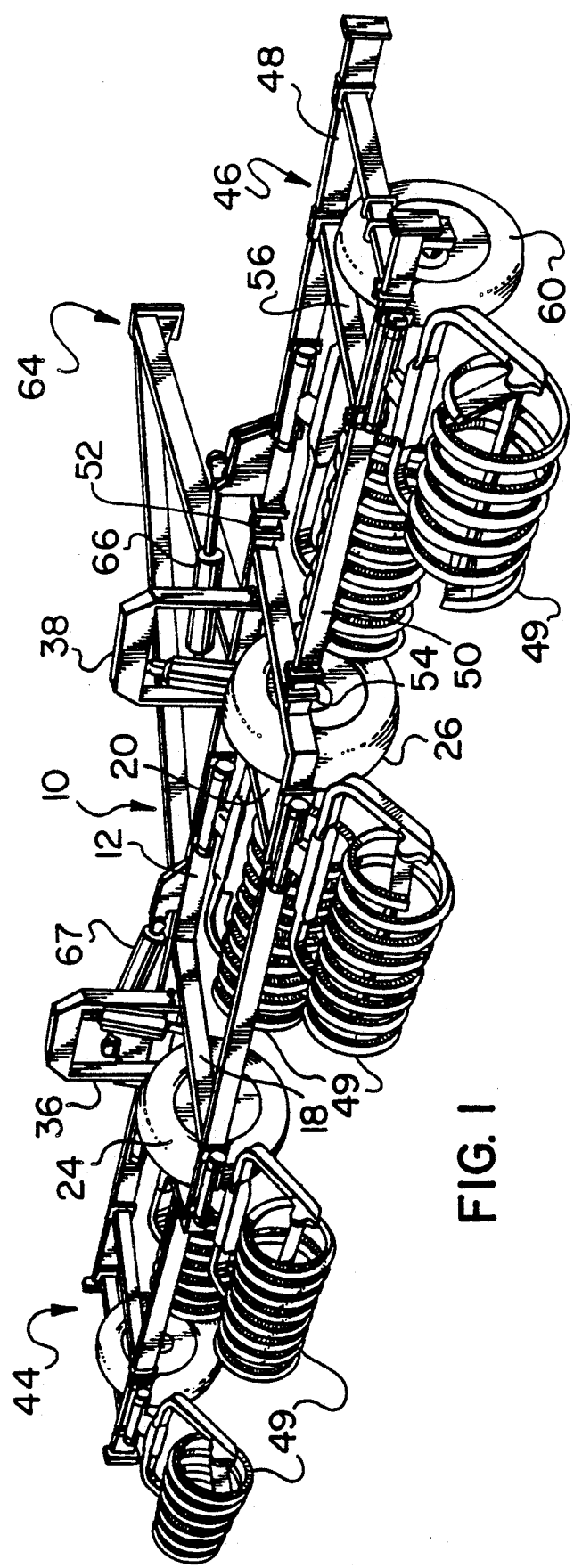
FIG. 1 is a rear perspective view of a packer according to the invention, in the working position.

A plurality of ground-engaging rollers 49 are affixed to the middle and wing frame sections. The rollers are preferably of the spiral coil type well known in the art. As shown in FIGS. 1 and 4, in the preferred embodiment a roller is attached to the forward member of the middle frame section 10 and of each wing frame section 44, 46. Two rollers are attached to the rear member of the middle frame section and one to the rear member of each wing frame section. The rollers are attached so as to trail behind the member to which they are attached as the packer is towed forward. The arrangement of rollers is staggered, so that alternate rollers are affixed to the forward and rearward frame members. The rollers are so spaced and of sufficient length as to overlap slightly, to ensure complete ground coverage by the rollers as the packer is towed.

Figure 3:
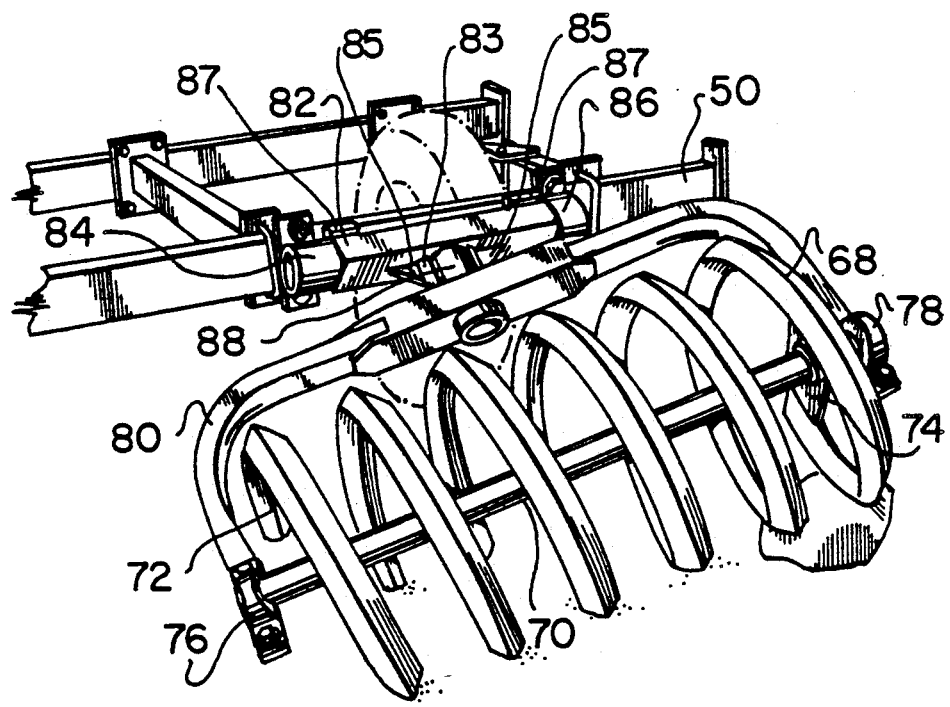
FIG. 3 is a perspective view of an individual roller with pivotal attachments.

As shown in FIG. 3, the rollers comprise a spiral coil 68, an axle 70 affixed to either end of coil 68 by end plates 72, 74. The ends of axle 70 are rotatably engaged in bearings 76, 78. These bearings are affixed to either end of roller support member 80.

The attachment of the roller support member 80 to the packer frame will now be described. The means of attachment to the forward and rearward members of middle frame and wing frame sections is the same in each case. For convenience, attachment to the rear member 50 of wing frame section 46 is described.

Referring to FIG. 3, roller support member 80 is affixed to rearward member 50 by means of two mutually perpendicular axes which permit the roller to move up and down relative to member 50 as it trails behind member 50, and also to pivot from side to side in response to uneven terrain or in response to one end of the roller encountering an obstacle such as a rock. Roller pivot 82 is affixed to the trailing side of rearward member 50 by pivot brackets 84, 86, which permit it to pivot about a first axis parallel to the ground and perpendicular to the forward direction of travel of the packer. Roller pivot 82 has a cylindrical pivot member 88 extending perpendicularly therefrom which is rotatably held in a bore through roller support member 80. Pivot member 88 acts as a second axis perpendicular to the first axis, permitting the roller to rock or pivot from side to side. Stop members 87 welded to roller pivot 82 limit the extent of upward rotation about the first axis. Similar stop members (not illustrated) are provided on the underside of roller pivot 82 to limit the extent of downward rotation about the first axis to facilitate lifting the rollers from the ground when the frame is raised to convert the packer to the transport position, as described below. Both sets of stop members also control the position of the rollers on the wing frame sections when in the transport position, i.e. they limit the extent to which the roller can rotate about a vertical axis. To limit the extent of rotation about the second axis, again to facilitate conversion to and stability in the transport position, stop rods 83 (the left-hand one only being visible in FIG. 3) are welded to roller support member 80. These limit the extent of rotation about the second axis by abutting against stops 85, which are welded to roller pivot 82.

In one embodiment (not illustrated) a three-axis pivot is provided, the third axis being perpendicular to both the first and second axes. In this embodiment, the roller support member 80 has a limited degree of rotation, e.g. 15° about the third axis, which reduces skidding of the outermost rollers when the packer is towed through a sharp turn.

In use in the working position, i.e. with the wings in the lowered portion and all rollers in contact with the ground, the packer is pulled behind a tractor, or behind a cultivator or herbicide applicator or fertilizer applicator, as desired. The rollers turn and maintain contact with the ground, packing the soil to reduce moisture loss.

Individual rollers ride up over obstacles by virtue of pivoting of the roller support member about the first axis, without raising the entire frame and putting great strain thereon. Also, the wing frame sections 44, 46 as a whole can pivot upward and downward to a limited extent, e.g. 15°, relative to the middle frame section, which also helps maintain all rollers in contact with the ground or uneven terrain.

To convert the unit to the transport position, shown in FIG. 2, the hydraulic cylinders are actuated. First, cylinders 40 and 42 are actuated to pivot the middle frame section 10 upward with respect to ground-engaging wheels 24, 26. This lifts the rollers (not shown in FIG. 2) affixed to middle frame section 10 upward out of contact with the ground. To a limited extent, the wing sections are also raised as the middle frame section is lifted. Next, hydraulic cylinders 66, 67 (cylinder 67 being the element corresponding to cylinder 66, discussed above, on the opposite wing), pivot the wing sections upward to a vertical position. The wings can now be locked in the vertical position and the middle frame section locked in the upper position by latch means (not illustrated). The packer is then in the transport position, for towing on roads or across fields.

To convert the packer back into the working position, after opening the latch means, the hydraulic cylinders 66, 67 are actuated to lower the wings into contact with the ground. Then hydraulic cylinders 40, 42 are actuated to lower the middle frame section. The sequence described for converting the packer into the transport position and into the working position is preferred in order to keep the rollers on the wing sections from moving laterally while in contact with the ground. The sequence can be achieved by an operator actuating the cylinders in the order described or by means of a sequencing valve in the hydraulic system which controls the sequence of actuation once the operator actuates the system. The lines and valves needed to actuate the hydraulic cylinders on the packer are well known to those skilled in the art, and are not illustrated in the drawings. Although the preferred embodiment described above has two wing frame sections, the invention can readily be adapted to larger packers having four or more wing frame sections.

The embodiments of the invention in which an exclusive property or privilge is claimed are defined as follows:

1. A packer adapted for towing across the ground behind a power source or in tandem behind another wheeled implement such an air seeder, comprising:
   (a) a middle frame section;
   (b) hitch means affixed to said packer for attachment to a vehicle;
   (c) a plurality of ground-engaging wheels rotatable affixed to said middle frame section;
   (d) two wing frame sections pivotally attached to said middle frame section and extending laterally therefrom and adapted for pivoting downwards when in the working position to remain a predetermined height over uneven ground;
   (e) at least one ground-engaging roller pivotally attached by a roller pivot to each of said middle frame section and said wing frame sections about a first axis substantially parallel to the ground when in the working position and perpendicular to the forward direction to permit each said roller to move up and down, and about a second axis perpendicular to said first axis and oblique to the ground by attachment to a pivot member connected to said roller pivot to permit each said roller to pivot from side to side, whereby without pivoting about an additional, vertical axis the roller follows the contour of the ground and when encountering objects such as rocks will pivot upwardly and obliquely thereby avoiding damage to the roller and frame sections;
   (f) said ground-engaging rollers being staggered in overlapping relationship wherein said middle frame section and said wing sections comprise forward members and rearward members both on which are mounted rollers thereby completely packing the land over which the packer traverses;
   (g) a ground-engaging wheel rotatably affixed to each of said wing frame sections;
   (h) means for pivotally lifting said middle frame section from a working position in which said roller attached to said middle frame section is in contact with the ground to a transport position in which said roller is out of contact with the ground;
   (i) means for pivotally lifting said wing frame sections from a working position in which said rollers and wheels attached thereto are in contact with the ground to a transport position in which said rollers and wheels are set out of contact with the ground; and
   (j) said wing frames being adapted for substantially vertical orientation when in the transport position, whereby it is not necessary to move the packer implement rearwardly in order to move the implement from the transport to the operating position or vice versa.

2. A packer according to claim 1 in which said wing frame sections are substantially perpendicular to said middle frame sections when said wing frame sections are in the transport position.

3. A packer according to claim 1 in which said rollers are coil packer elements.

4. A packer according to claim 1 wherein said wing frame sections are lockable in said transport position.

5. A packer according to claim 1 in which said means for pivotally lifting said middle frame section and said means for pivotally lifting said wing frame sections comprise hydraulic means and sequencing means for lifting said middle frame section before lifting said wing frame sections when converting said packer to said transport position and for lowering said wing frame sections before lowering said middle frame section when converting said packer to said operating position.

6. A packer according to claim 1 in which a roller is affixed to said forward member of said middle frame section and a roller is affixed to said forward member of each of said wing frame sections and two rollers are affixed to said rearward member of said middle frame section and a roller is affixed to said rearward members of each of said wing frame sections.

7. A packer according to claim 1 wherein there are four wing sections, two on each side of said middle frame section.

* * * * *